UNITED STATES PATENT OFFICE.

WILLIAM H. ROSS, OF BROOKLYN, NEW YORK.

IMPROVEMENT IN COMPOSITIONS FOR BURIAL CASKETS.

Specification forming part of Letters Patent No. 141,238, dated July 29, 1873; application filed October 22, 1872.

*To all whom it may concern:*

Be it known that I, WILLIAM H. ROSS, of the city of Brooklyn, in the State of New York, have invented a certain incorruptible and impervious Compound to be used in the Manufacture of Burial Caskets, of which the following is a specification:

The nature of the invention consists in mixing, with dissolved asphaltum, silica and oil, tallow, or other unctuous material.

It is preferable to have about equal weights of the asphaltum and silica, but other proportions answer the purpose. The oil, tallow, or other unctuous material is put in the caldron with the asphaltum, and the mass is heated until the asphaltum is melted. Then powdered silica is added, and the whole thoroughly mixed together. The oil, or unctuous material, assists in melting the asphaltum, and also gives toughness to the compound.

When the compound is thoroughly mixed I pour it into suitable molds to form the body of the casket.

I claim as my invention—

A compound for burial caskets, composed of asphaltum and silica, in variable proportions, and a small quantity of oil, tallow, or other unctuous material, substantially as set forth.

WILLIAM H. ROSS.

Witnesses:
    WM. LARZELERE,
    STEPHEN USTICK.